United States Patent [19]

Bahr et al.

[11] Patent Number: 5,491,391
[45] Date of Patent: Feb. 13, 1996

[54] START UP CIRCUIT FOR CONTINUOUS SINE-WAVE COMMUTATED BRUSHLESS MOTORS

[75] Inventors: Allen A. Bahr; Du V. Nguyen; Gary A. Teichman, all of Tucson, Ariz.

[73] Assignee: International Business Machines Corporation, Armonk, N.Y.

[21] Appl. No.: 122,113

[22] Filed: Sep. 16, 1993

[51] Int. Cl.⁶ .................................................. B23Q 5/10
[52] U.S. Cl. .............................. 318/39; 318/54; 318/65; 318/603; 318/439
[58] Field of Search .................................... 318/603, 640, 318/594, 627, 685, 254, 138, 439, 39, 45, 50, 54, 65, 66, 55, 77, 102, 103; 324/144, 150, 143, 166, 163

[56] References Cited

U.S. PATENT DOCUMENTS

| | | | |
|---|---|---|---|
| 4,429,262 | 1/1984 | Utenick | 318/627 |
| 4,429,267 | 1/1984 | Veale | 318/594 |
| 4,455,513 | 6/1984 | Fulton et al. | |
| 4,510,422 | 4/1985 | Ogura | |
| 4,661,756 | 4/1987 | Murphy et al. | 318/138 |
| 4,839,834 | 6/1989 | Omae et al. | 324/166 |
| 4,879,498 | 11/1989 | Shinohara et al. | |
| 4,879,510 | 11/1989 | Itoh | 324/150 |
| 4,969,739 | 11/1990 | McGee | |
| 5,194,794 | 3/1993 | Shamoto | |

FOREIGN PATENT DOCUMENTS 0251785   1/1988   European Pat. Off.

OTHER PUBLICATIONS

Gerhard Pfaff et al., "Design and Experimental Results of a Brushless AC Servo Drive", IEEE Transactions On Industry Applications, vol. IA-20, No. 4, Jul./Aug. 1984, pp. 814–821.

Primary Examiner—John W. Cabeca
Attorney, Agent, or Firm—Manny Schecter; Andrew J. Dillon

[57] ABSTRACT

Automatic start up of a continuous sine-wave commutated, brushless, direct current motor in a predetermined direction is done by applying a ramped armature current to the direct current motor to generate an armature field. The resulting armature field is rotated independent of angular position of the shaft. Upon rotation of the motor shaft beginning, the direction of rotation of the shaft is determined. Responsive to rotation of the shaft in an undesired direction, the direction of rotation of the armature field is reversed. A base angle of rotation of a shaft in the direct current motor is determined from an index mark as it rotates by an index mark detector. Responsive to detection of the index mark, rotation of the armature field and the angular position of the shaft are synchronized.

1 Claim, 4 Drawing Sheets

START UP CIRCUIT FOR CONTINUOUS SINE-WAVE COMMUTATED BRUSHLESS MOTORS

BACKGROUND OF THE INVENTION

1. Technical Field

The invention relates to continuous sine-wave commutation for brushless motor drivers and particularly to a method and circuit for start up of such motors where used in magnetic tape drives.

2. Description of the Related Art

A magnetic tape drive is a mechanism for controlling the movement of magnetic tape past a read or write head and for rewinding of the magnetic tape. A tape drive includes separate motors for driving a tape take-up reel and a tape supply reel. The motors are referred to here as the take-up motor and the supply motor, respectively.

In operating the take-up motor or tape supply motor it is important that tension be kept on the magnetic tape. The motors should not be operated in a fashion which results in the tape being pushed, or tension being released, for too long. If tape is pushed it can come off of its reel or leave the tape path with the possible destruction of the tape and the data thereon. Human intervention may be required to rewind or to replace the tape. Tape drive operation maintains tape linear velocity under tight control. Reel motor angular velocity varies with tape radius on the reels, which is continuously calculated by a motion control processor. Under these conditions tape tension is very difficult to control, which is why the collective and differential torques of the supply and takeup reel motors are directly controlled by the motion control processor.

As data density used with magnetic tape is increased, ever greater smoothness in take-up and supply motor torque is required. Commutation schemes to achieve smooth and highly controlled torque have relied on expensive brush commutated motors, or, in brushless motor designs, six-step commutation via Hall sensors. Six-step commutation causes, at best, a 14% variation in rotor torque at the commutation crossover points because motor torque versus shaft angle looks like a full-wave rectified three phase sine wave. A 12-step commutation system has been proposed which is claimed to achieve a 4% crossover dip, but is not known to have been applied to tape drives.

Commutation control for a brushless motor depends upon a scheme for synchronizing magnetic fields with rotor magnets. Commutation control is done by tracking phase (i.e. rotational) position of the motor shaft which carries the rotor magnet. Phase position of the shaft of a motor may be determined by use of an absolute position encoder. Absolute position encoders are, however, quite expensive. It would be cheaper to substitute an incremental encoder system which tracks change in position from a known starting point.

Certain problems arise from using an incremental encoder. For example, upon power up from a power interruption or shut down, the drive mechanism starts with no information about shaft phase. Until an index for the incremental encoder is found no shaft phase information will be available. As described in the article Design and Experimental Results of a Brushless AC Servo Drive, Pfaff et al., IEEE Transactions on Industry Applications, Vol. IA-20, No. 4 (July/August 1984), restart of a brushless AC servo motor after loss of phase information can be jerky and possibly in the wrong direction. To solve these problems, Pfaff proposed a startup controller with a limited output current and a direction detection element for reversing motor direction, if needed.

The need to protect a tape mounted on the tape drive mechanism from damage during startup, while searching for the shaft index mark, still further complicates use of synchronous AC servos with magnetic tape units and has prevented commercial application of incremental encoding to control commutation for brushless motors in automated tape drive mechanisms.

SUMMARY OF THE INVENTION

It is therefore one object of the invention to provide an improved circuit and method for controlling start up of continuous sine-wave commutated brushless motors.

It is another object of the invention to provide a system and method for locating an index for an incremental position encoder used to control commutation of a continuous sine-wave commutated brushless motor.

The foregoing objects are achieved as is now described. The apparatus and method of the invention provide automatic start up of a continuous sine-wave commutated, brushless, direct current motor in a predetermined direction. Upon power up a plurality of phase differentiated and ramped armature currents are applied to the direct current motor to generate an armature field. The resulting armature field is rotated independent of angular position of the shaft as a function of a slow clock. Upon initial rotation of the motor shaft, a direction of rotation of the shaft is determined. Responsive to rotation of the shaft in an undesired direction, the direction of rotation of the armature field is reversed. A base angle of rotation of a shaft in the direct current motor is determined from an index mark as it rotates by a index mark detector. Responsive to detection of the index mark, rotation of the armature field and the angular position of the shaft are synchronized.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
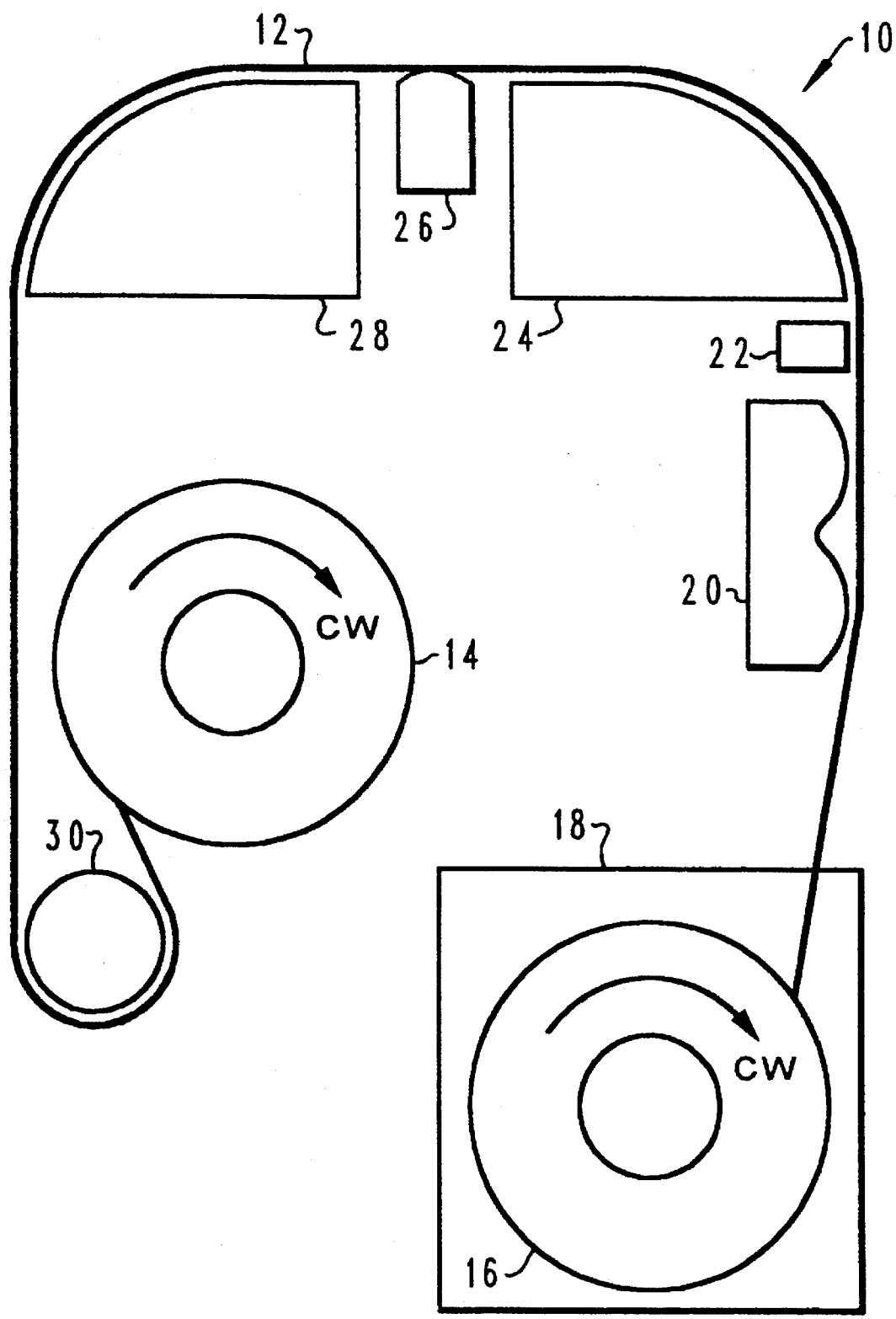
FIG. 1 is a front plan view of a magnetic tape unit.

FIG. 1 illustrates in front plan view a magnetic tape unit 10. Magnetic tape unit 10 transports magnetic tape 12 back and forth between a take-up reel 14 and a supply reel 16 mounted within a tape cassette unit 18. As magnetic tape 12 is unwound from supply reel 16 it is transported over a vacuum pocket 20 to a cleaner blade 22. Magnetic tape 12 is then threaded over an air bearing member 24, read/write head 26 and a second air bearing member 28. From air bearing member 28 magnetic tape 10 is wound on an air bearing tension sensor 30 and then onto a take-up reel 14 which is used to pull magnetic tape 12 from supply reel 16 during read and write operations. Arrows on take-up reel 14 and supply reel 16 indicate a clockwise direction of rotation of the reels. Differential torque applied to reels 14 and 16 keeps magnetic tape 12 under tension so that magnetic tape 10 does not leave the transport path defined by the elements described above. A supply motor (not shown) and a take-up motor (not shown) are used to apply torque to take-up reel 14 and supply reel 16, respectively, to control movement of the reels and movement of magnetic tape 12. Typically a motor shaft drives the reels although some other drivetrain driven by the motor rotor is conceivable.

Figure 2:
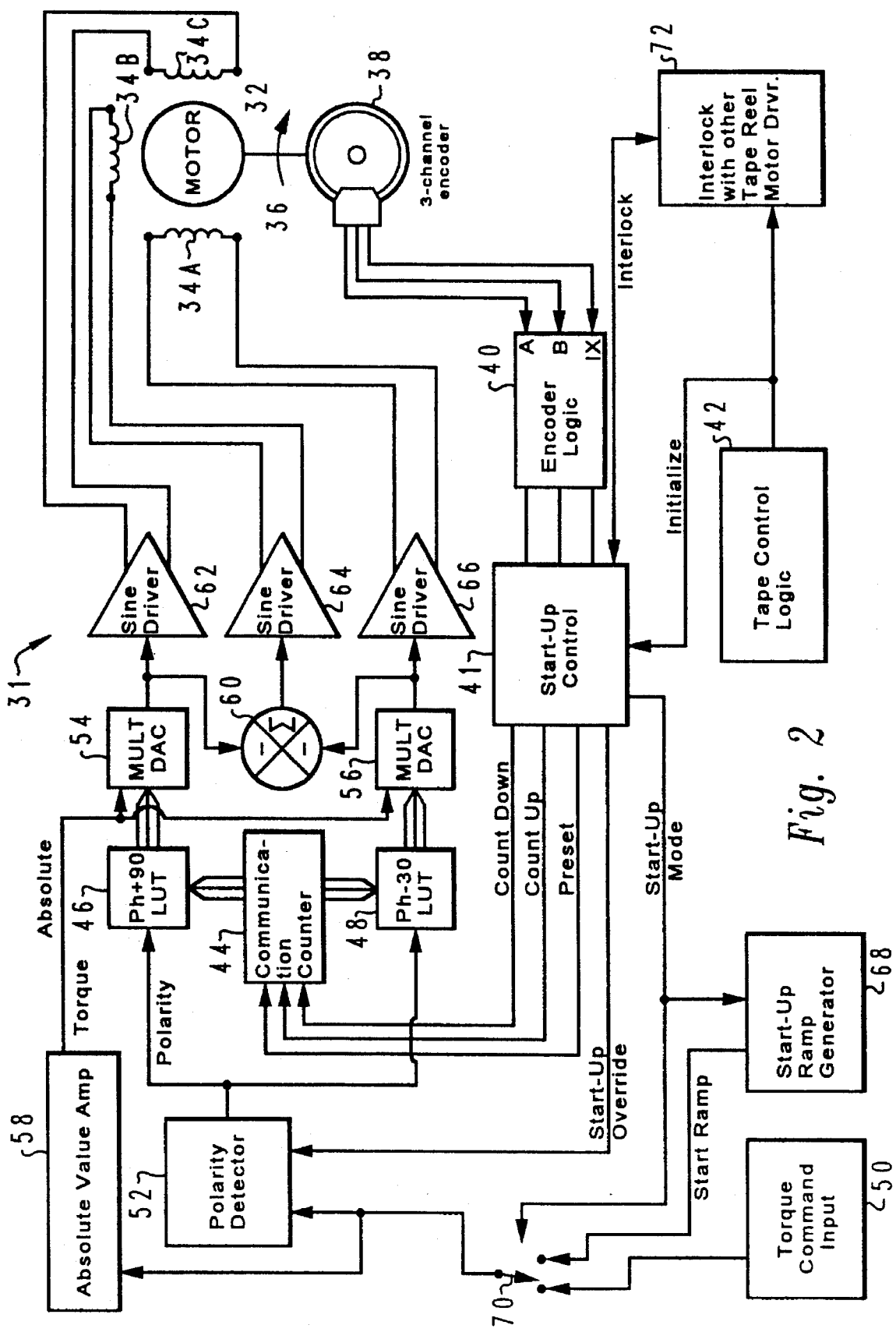
FIG. 2 is a block diagram of a commutation control circuit for a drive motor for the magnetic tape unit of FIG. 1.

FIG. 2 is a block diagram of a driver circuit 31 for controlling the torque applied by motor 32 to either a take-up reel 14 or a supply reel 16. Driver circuit 31 controls the energizing of brushless motor 32 by control of current flowing through armature field coils 34a, 34b and 34c. Three armature field coils are used to establish a rotating armature field, essentially free of variation in strength. Magnets mounted on a shaft 36 of motor 32 cause rotation of the shaft to bring the field of the permanent magnets in line with the rotating armature field. While a permanent magnet rotating field brushless motor is preferred, the field could be supplied by slip-ring powered field windings on the rotor. Motor 32 is a type of synchronous machine in which applied armature currents are slaved to the position of rotor field magnets is often termed a "brushless DC motor" in the trade.

In normal operation, commutation of current through armature fields 34a–c is controlled by the rotational phase of shaft 36. To do this, shaft 36 drives a 3 channel quadrature optical encoder 38. Encoder 38 is a 2 channel (A and B) incremental encoder with third channel (IX) for carrying an index pulse. Signals on channels A, B and IX are received by encoder logic 40 for pulse qualification and other logical processing before being passed as logic signals to startup controller 41. The logic signals generated by encoder logic 40 include a countdown signal, a countup signal and a preset signal used for resetting a commutation counter 44. In normal, synchronized operation startup controller 41 passes the countdown, countup and preset signals from encoder logic 40 to commutation counter 44. However, during a startup mode initialized by tape control logic 42, startup controller 41 blocks transmission of these signals and substitutes other signals. Prior to explaining these other signals, normal functioning of driver 31 is further explained.

Commutation counter receives the countdown, countup and preset signals from encoder logic 40 from startup controller 41. A preset signal is issued each time an index mark passes the detector of 3 channel encoder 38. Preset sets commutation counter 44 at a value corresponding to a phase angle of shaft 36 defined to be equal to 0°. The signals on lines A and B into encoder logic 40 are 90° out of phase with one another allowing encoder logic 40 to determine a direction of rotation of shaft 36. In normal operation clockwise rotation results in counting in one direction (e.g. count up), while counterclockwise rotation results in count signals in the opposite direction (e.g. countdown). The value in commutation counter 44 is a digital representation of the phase angle of shaft 36.

The current phase angle stored in commutation counter 44 is used to address entries in lookup tables 46 and 48 to generate angle sensitive outputs. The desired direction of rotation is controlled by a torque command input 50 through switch 70 to polarity detector 52. The output of polarity detector 52 is applied to sine lookup tables 46 and 48 to control the polarity of the output from the lookup tables. The outputs of lookup tables 46 and 48 are phase shifted by 120° with respect to one another. Multiplying digital to analog converters 54 and 56 multiply the absolute torque analog voltage from amplifier 58 by the signed digital values from the sine look up tables 46 and 48. Polarity detector 52 and absolute value amplifier 58 could be eliminated by use of four-quadrant digital to analog converters for multiplying digital to analog converters 54 and 56. Digital to analog converters 54 and 56 generate sine-waves, which are 120° phase shifted with respect to one another. The outputs of digital to analog converter 54 and 56 are applied to summer 60 to generate a third sine-wave of equal amplitude which is 120° out of phase with respect to the outputs of digital to analog converter 54 and digital to analog convert 56. The three sine-wave outputs of digital to analog converters 54 and 56 and summer 60 are applied to sine drivers 62, 64 and 66 respectively. Sine drivers 62, 64 and 66 are current limited pulse width modulated bridge devices for controlling current in armature coils 34a–34c. With application of current to armature coils 34a, 34b and 34c, an armature field is generated which rotates in synchronization with changes in the phase value in commutation counter 44.

Tape control logic 42 initializes a startup mode. Startup control 41, during startup mode, disconnects encoder logic 40 from commutation counter 44, and substitutes, on either the countdown or countup line, a clock signal. The selection of count-up or count down for as the insertion line for the clock signal is governed by which direction represents clockwise. Clockwise rotation corresponds to increased tape tension. The same line is always clocked during start-up, even if armature magnetic field polarity has to be reversed to prevent pushing on a tape. At the same time a startup mode signal is applied to a startup ramp generator 68 and to switch 70 to move switch 70 from torque command input 50 to startup ramp generator 68. Prior to the clock signal being received by commutation counter 44, the preset line from startup controller 41 to commutation 44 is used to reset the value in commutation counter 44 to that received when an index has been encountered. As commutation counter 44 is incremented in response to the clock signal, a startup ramp 68 is applied to polarity detector 52 and absolute value amplifier 58 in place of a torque command input.

As the ramp signal gradually builds, an armature field slowly develops, which turns shaft 36. Startup controller 41 monitors logic outputs corresponding to lines A and B to determine the direction of rotation. If the direction of rotation is such as would push on magnetic tape if installed on magnetic tape unit 10, the startup override line is set high from startup controller 41 to polarity detector 52. This reverses the polarity output of polarity detector 52 to lookup tables 46 and 48, with the result that the armature field developed by coils 34a–34c reverses both in polarity and in direction of rotation to reverse the direction of rotation of shaft 36. Upon encoder 38 encountering the index mark, startup controller 41 reconnects the countdown and countup outputs of encoder logic 40 to commutation counter 44. At the same time a preset signal is sent to reset the commutation counter and the startup override and startup mode signals are released.

Reel motor 32 is a true synchronous machine in start-up mode, with shaft magnets aligning with the armature magnetic field vector. After start-up is completed, the armature magnetic field vector moves to a position 90 degrees out of phase with the rotor field to deliver maximum torque, as in a brush-commutated DC motor.

Magnetic tape unit 10 includes drive circuits 31 for both supply reel motors and takeup reel motors. Coordination of operation of the two drive circuits during startup mode is provided through interlock 72. It is preferable to search for the index mark for the takeup reel 14 prior to locating the index mark for supply reel 16. This is because there is assurance that surplus magnetic tape 12 will be wound on supply reel 16, while there is no assurance that surplus tape will be wound on takeup reel 14. Rotation of takeup reel 14 to find an index mark winds tape on the takeup reel. Reel 16 can then be rotated to pull tape back off reel 14 while the index mark for the drive motor for reel 16 is searched out. While startup controller 41 is in startup mode, a comparable startup controller for the second motor is disabled allowing free rotation of the reel which it drives. Interlocks passed between startup controllers 41 through interlock mechanism 72 provide that only one startup controller at a time is in startup mode and that the remaining startup controller is disabled during that period.

Figure 3:
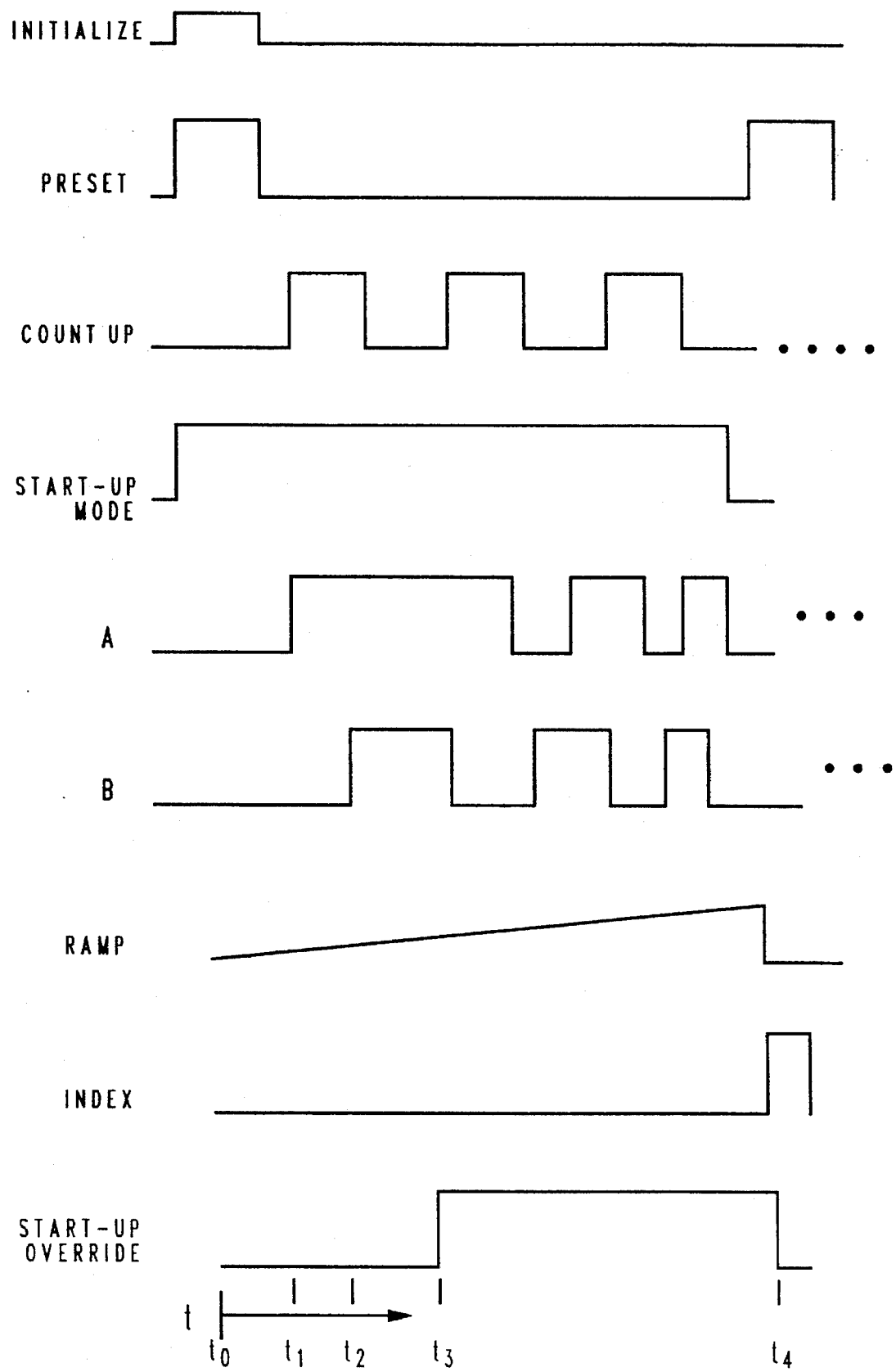
FIG. 3 is timing diagrams for start up operation of the commutation control circuit of FIG. 2.

FIG. 3 is a simplified timing chart relating to startup mode of a drive circuit 31. At time T0 an initialization signal is generated. In response to the initialization signal a preset pulse or value is issued and the startup mode signal goes high. In response to the startup mode signal going high a ramp signal begins. At a time T1 subsequent to T0 the countup signal lines begins to carry pulses from a slow clock. Subsequent to T1, signal line A goes high indicating rotation of 3 channel encoder 38. At a time T2 the signal on line B goes high, following the line on signal A by 90°. At time T3 startup control 41 has determined that shaft 36 is turning in the wrong direction resulting in startup override going high. In response to startup override going high the direction of rotation of armature fields generated by coils 34a–c reverses direction resulting in a shift of the phase relationship of the leading edges of pulses on lines B and A. This continues until the index mark is found, at which point startup mode ends and the value in commutation counter 44 is reset. The values on lines A and B are now patched through as up counts or down counts, depending on the phase relationship between B and A, to commutation counter 44.

The index pulse always operates the counter preset. The preset value is usually 0, but may be offset from 0 to account for inaccuracy in aligning the encoder index mark with the rotor magnets. Such offsets may be programmed upon measurement for a particular motor. If the component functions are realized using a digital signal processor, it would be practical to have a variable counter preset as a function of rotor angular velocity and torque. Advancing or retarding the armature field angle can then be done to compensate for armature inductance during acceleration and braking. This could be used to increase motor efficiency, to further smooth constant torque, or both.

Figure 4:
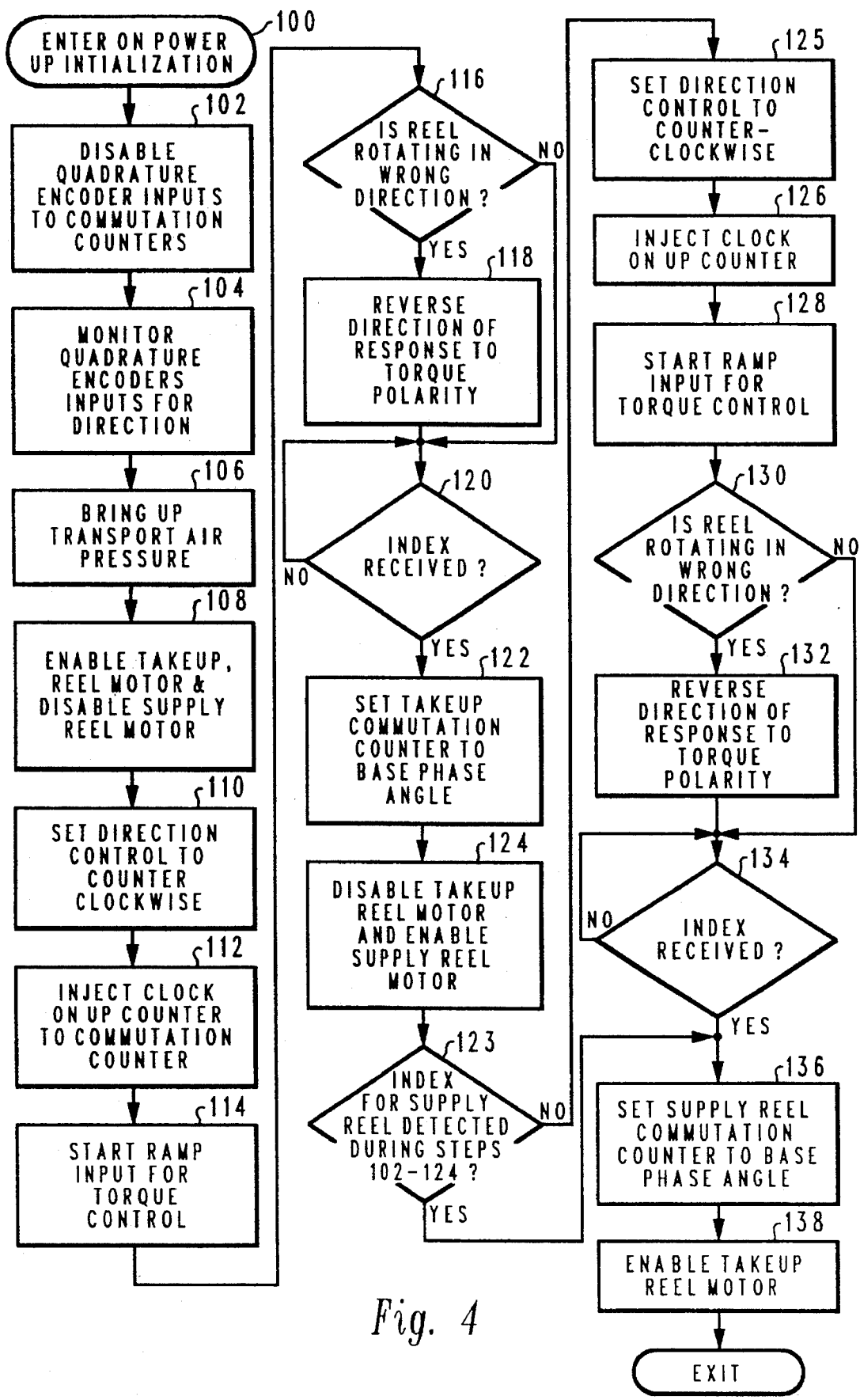
FIG. 4 is a logical flow chart of a program executed by a microprocessor controlling the magnetic tape unit of FIG. 1.

FIG. 4 is a flowchart illustrating a process for coordination of startup of drive motors for both takeup reel 14 and supply reel 16. The process of FIG. 4 is entered with step 100 upon entry to power up initialization of magnetic tape unit 10. At step 102, quadrature encoder inputs to the commutation counters of the takeup and supply reel motors are disabled. Next, at step 104 direction detection is engaged to monitor the quadrature encoders' inputs. Next, at step 106 transport air pressure is brought up on the air bearing members and tension sensors of magnetic tape unit 10. At step 108 the takeup reel motor is enabled for operation and the supply reel motor is disabled. Next, the direction control sensor is set to detect counterclockwise rotation at step 110. While disabled, the takeup or supply reel motor is set to zero shaft torque (i.e. zero armature current). The commutation counter for the motor remains active to keep track of shaft position during any start-up operations.

At step 112, a clock signal is applied to the up counter to the commutation counter to the takeup reel commutation counter. Next, at step 114 a ramp input is applied for torque control.

At step 116 it is determined if the takeup reel is rotating in the wrong direction. If it is, step 118 is executed to reverse direction of response to torque polarity from the ramp input. Following step 118, or following the NO branch from step 116, step 120 is executed to determine if an index value has been received. If no index has been received, the NO branch is followed to step back to the input to step 120 after a delay.

Once an index is received, the YES branch is followed to step 122 where the takeup commutation counter is set to the base phase angle. Next, at step 124, the takeup reel motor is disabled and the supply reel motor is enabled to provide synchronization of the supply motor.

Start-up operates whether magnetic tape is threaded on a magnetic tape unit 10 or not at the moment power comes on. If tape is threaded there is a possibility that the index mark for the supply reel motor will be found while the take up reel is rotating during steps 116 to 120 and removing tape from the supply reel. Step 123, is shown following step 124, to reflect this occurrence. Performing an index mark location process for the supply motor is not required under these circumstances, and the YES branch from step 123 skips the program ahead to step 136, which is described below. Step 123 and the actions of steps 136 and 138 may be performed during continuation of the search for the index mark for the take up motor.

Following the NO branch from step 123, step 125 provides a direction control for the supply reel, which is set to counterclockwise. Next, at step 126 a clock signal is applied to the up counter to the supply reel commutation counter. Next, at step 128 a ramp input is provided for torque control. At step 130 it is determined if the reel is turning in the counterclockwise direction. If YES, step 132 is executed to reverse direction of response to torque polarity. After step 132, or following the NO branch of step 130, a wait mode for receipt of an index mark is entered at step 134. Upon detection of the index mark from the encoder, step 136 is executed to set the supply reel commutation counter to the base phase angle. Next, step 138 is executed to reenable the takeup reel motor and to allow magnetic tape unit 10 to enter normal operation. The process is then exited.

Startup ramp and generator 68, torque command input 50 and switch 70 may be embodied in a digital signal processor to reduce fabrication cost. Similarly tape control logic 42 is provided by a microcontroller which may assume other aspects of control of magnetic tape unit 10. The invention provides for synchronization of supply reel and takeup reel drive motors upon cold start of a magnetic tape unit 10. The invention allows for automatic power up where a tape cartridge is already threaded. By minimizing pushing on the tape possible damage to a tape is avoided.

The invention has been described for use with 3-channel encoders having a single index event per shaft rotation. The availability of multiple mark encoders, where one mark was aligned to each pair of rotor magnet poles, would make start up faster.

While the invention has been particularly shown and described with reference to a preferred embodiment, it will be understood by those skilled in the art that various changes in form and detail may be made therein without departing from the spirit and scope of the invention.

What is claimed is:

1. A tape drive mechanism, comprising:

means for setting phase angle counters for a shaft for a takeup motor and for a shaft for a supply motor to predetermined values;

means for locking out the supply motor;

means for incrementing the phase angle counter for the takeup motor;

means for generating a ramp scaler for the takeup motor;

means responsive to the phase angle counter for the takeup motor and ramp scaler for the takeup motor for generating a plurality of phase differentiated armature currents;

means for detecting a direction of rotation of the takeup motor;

means responsive to the takeup motor rotating in an undesired direction for reversing the direction of the armature currents;

means responsive to encountering an index mark defining take up motor rotation position for setting the phase angle counter to a predetermined base phase value and locking out the takeup motor while enabling the supply motor;

means for incrementing the phase angle counter for the supply motor;

means for generating a ramp scaler for the supply motor;

means responsive to the phase angle counter for the supply motor and ramp scaler for the supply motor for generating a plurality of phase differentiated armature currents for the supply motor;

means for detecting a direction of rotation of the supply motor;

means responsive to the supply motor rotating in an undesired direction for reversing direction of the armature currents; and means responsive to encountering an index mark for the supply motor for setting the phase angle counter for the supply motor to a predetermined base phase value and enabling the takeup motor.

* * * * *